(12) United States Patent
Wang et al.

(10) Patent No.: US 10,934,412 B2
(45) Date of Patent: Mar. 2, 2021

(54) POLY(TEREPHTHALATE-CO-SEBACATE) RESIN COMPOSITION

(71) Applicant: Kingfa Sci. & Tech. Co., Ltd., Guangdong (CN)

(72) Inventors: Weiwei Wang, Guangdong (CN); Zhimin Yuan, Guangdong (CN); Tongmin Cai, Guangdong (CN); Xianbo Huang, Guangdong (CN); Xiangbin Zeng, Guangdong (CN); Renxu Yuan, Guangdong (CN); Zhilong Guo, Guangdong (CN); Meijun Tang, Guangdong (CN)

(73) Assignee: Kingfa Sci. & Tech. Co., Ltd., Guangdong (CN)

( * ) Notice: Subject to any disclaimer, the term of this patent is extended or adjusted under 35 U.S.C. 154(b) by 56 days.

(21) Appl. No.: 16/311,262

(22) PCT Filed: Nov. 30, 2017

(86) PCT No.: PCT/CN2017/113753
§ 371 (c)(1),
(2) Date: Dec. 19, 2018

(87) PCT Pub. No.: WO2018/107971
PCT Pub. Date: Jun. 21, 2018

(65) Prior Publication Data
US 2019/0248981 A1     Aug. 15, 2019

(30) Foreign Application Priority Data
Dec. 12, 2016  (CN) .......................... 201611136499.4

(51) Int. Cl.
*C08K 5/01*     (2006.01)
*C08J 5/18*     (2006.01)

(52) U.S. Cl.
CPC .................... *C08K 5/01* (2013.01); *C08J 5/18* (2013.01); *C08J 2367/02* (2013.01)

(58) Field of Classification Search
None
See application file for complete search history.

(56) References Cited

U.S. PATENT DOCUMENTS

| | | | |
|---|---|---|---|
| 4,415,696 A | 11/1983 | Mark | |
| 4,686,256 A * | 8/1987 | Boutni | .............. C08K 5/01 524/285 |
| 2008/0194770 A1 | 8/2008 | Bastioli et al. | |
| 2010/0317772 A1 | 12/2010 | Lin | |
| 2011/0020660 A1 | 1/2011 | Bastioli et al. | |
| 2011/0237743 A1* | 9/2011 | Ren | .............. C08J 5/18 524/605 |
| 2017/0137591 A1 | 5/2017 | Mukaiyama et al. | |
| 2018/0179375 A1* | 6/2018 | Lu | .............. C08L 25/14 |

FOREIGN PATENT DOCUMENTS

| | | |
|---|---|---|
| CN | 105585823 A | 5/2016 |
| CN | 105585826 A | 5/2016 |
| CN | 105713356 A | 6/2016 |
| EP | 3260497 A1 | 12/2017 |
| JP | S62174256 A | 7/1987 |
| JP | H03292355 A | 12/1991 |
| JP | 2000080223 A | 3/2000 |
| JP | 2005144727 A | 6/2005 |
| JP | 2008536961 A | 9/2008 |
| JP | 2011518235 A | 6/2011 |
| WO | 2015194174 A1 | 12/2015 |

OTHER PUBLICATIONS

International Search Report for PCT/CN2017/113753 dated Mar. 6, 2018.
Japanese Search Report for Application No. 2018-562966, dated Nov. 14, 2019, pp. 1-11.
Supplementary European Search Report for Application No. EP17881804, dated May 12, 2020, 1 page.

* cited by examiner

*Primary Examiner* — Robert T Butcher
(74) *Attorney, Agent, or Firm* — JCIPRNET

(57) ABSTRACT

The present invention discloses a poly(terephthalate-co-sebacate) resin composition, comprising the following components: a. poly(terephthalate-co-sebacate); and b. an alkane, which is at least one selected from the group consisting of hexadecane, heptadecane, octadecane, nonadecane and eicosane; wherein a weight content of the alkane is 5 ppm-1000 ppm based on a total weight of the poly (terephthalate-co-sebacate) resin composition. The present invention controls the content of alkane in the composition within a range of 5 ppm-1000 ppm by adding an alkane, which not only enables the poly(terephthalate-co-sebacate) resin to have obviously improved blow molding properties, a film thickness range of less than 0.3 μm, and a relative deviation of film thickness of less than 2.0%, thereby guaranteeing a bubble stability and a continuity of blow molding, but also enables the film material to prevent the ink from stripping off the film material, and to prevent excessive ink from adhering to the film material in the printing process, so that the film shows excellent printing performance.

8 Claims, No Drawings

POLY(TEREPHTHALATE-CO-SEBACATE) RESIN COMPOSITION

CROSS REFERENCE TO RELATED APPLICATIONS

The present application is a national phase entry under 35 U.S.C. § 371 of International Application No. PCT/CN2017/113753, filed Nov. 30, 2017, which claims priority from Chinese Patent Application No. 201611136499.4 filed Dec. 12, 2016, all of which are hereby incorporated herein by reference.

TECHNICAL FIELD

The present invention belongs to the field of macromolecular material modification, and in particular to a poly(terephthalate-co-sebacate) resin composition.

BACKGROUND

Poly(terephthalate-co-sebacate) resin is a copolymer of butanediol sebacate and butanediol terephthalate, having high toughness and high temperature resistance because of containing a flexible aliphatic chain and a rigid aromatic chain, whilst being prompted to also have a biodegradability because of the presence of an ester bond. It is one of the very active degradable materials with best market applications in the research on biodegradable plastics at present.

In the process of preparing a film from the poly(terephthalate-co-sebacate) resin by blow molding, it frequently appears that the film adheres to the roller due to insufficient lubrication or fails to wind around the scroll due to excessive lubrication, thereby resulting in poor bubble stability and large thickness range of film material in the process of blow molding, and seriously affecting a continuity of the blow molding.

In addition, in the process of making the poly(terephthalate-co-sebacate) resin into a film by blow molding, printing is required to be performed and thereby desired label and logo are printed on the film. However, in the printing process of the poly(terephthalate-co-sebacate) resin film, it frequently appears unfirm printing (i.e. ink does not fully adhere to the film, or an adhesion strength is not enough) or excessive printing (i.e. too much ink adheres thereto, and the logo is unclear), thereby resulting in poor printing performance of the film.

The present invention surprisingly finds by researches that by adding a trace amount of at least one alkane selected from the group consisting of hexadecane, heptadecane, octadecane, nonadecane and eicosane into the poly(terephthalate-co-sebacate) resin composition, the poly(terephthalate-co-sebacate) resin has obviously improved blow molding characteristics, good bubble stability and small thickness range of film material during blow molding at a high velocity, thereby ensuring the continuity of blow molding. Furthermore, the poly(terephthalate-co-sebacate) resin composition can prevent the ink from stripping off the film material and prevent excessive ink from adhering to the film material in the printing process, so that the film shows excellent printing performance.

SUMMARY OF THE INVENTION

An object of the present invention is to provide a poly(terephthalate-co-sebacate) resin composition. By adding a trace amount of an alkane into the composition, the prepared poly(terephthalate-co-sebacate) resin composition may have excellent printing performance and obviously improved blow molding characteristics.

The present invention is implemented by the following technical solution:

A poly(terephthalate-co-sebacate) resin composition comprises the following components:

a. poly(terephthalate-co-sebacate); and
b. an alkane.

The alkane is at least one selected from the group consisting of hexadecane, heptadecane, octadecane, nonadecane and eicosane; wherein a weight content of the alkane is 5 ppm-1000 ppm based on a total weight of the poly(terephthalate-co-sebacate) resin composition.

Particularly, the weight content of the alkane is tested by the following method: 1.2000 g of precisely weighed poly(terephthalate-co-sebacate) resin composition is added in a 25 ml volumetric flask and dissolved with chloroform; after the poly(terephthalate-co-sebacate) resin composition is fully dissolved, it is diluted to the mark; a peak area of the alkane in the resulting solution is tested by GC-MS, and a content of alkane in the poly(terephthalate-co-sebacate) resin composition is obtained through calculation based on the peak area of the alkane in the resulting solution and a standard curve of the alkane; and the standard curve is calibrated by an alkane/chloroform solution.

The poly(terephthalate-co-sebacate) resin is a copolymer of butanediol sebacate and butanediol terephthalate. In the poly(terephthalate-co-sebacate) resin composition, by adding at least one alkane selected from the group consisting of hexadecane, heptadecane, octadecane, nonadecane and eicosane, which are non-polar micromolecules and play a role of lubrication in the resin, the present invention finds by researches that controlling the content of alkane in the poly(terephthalate-co-sebacate) resin composition within a range of 5 ppm-1000 ppm helps to improve a lubrication degree of the poly(terephthalate-co-sebacate) resin composition in the blow molding process, so that the obtained poly(terephthalate-co-sebacate) resin composition has a film thickness range of less than 0.3 μm and a relative deviation of film thickness of less than 2.0%, thereby guaranteeing a bubble stability and a continuity of blow molding, and enabling a dynamic friction coefficient of the film material to be in a reasonable range. Therefore, the ink is prevented from stripping off the film material (i.e., unfirm printing), and excessive ink is prevented from adhering to the film material in the printing process, so that the film shows excellent printing performance.

If the poly(terephthalate-co-sebacate) resin composition has a very low content of alkane and a very high dynamic friction coefficient, too much ink may adhere to the film in the printing process. If the poly(terephthalate-co-sebacate) resin composition has a very high content of alkane, during the film blowing process at high velocity, the film is too lubricating to wind around a roller well, which will also cause unstable film bubble. Preferably, based on the total weight of the poly(terephthalate-co-sebacate) resin composition, the weight content of the alkane is 10 ppm-500 ppm, and more preferably 15 ppm-100 ppm.

A melt index of the poly(terephthalate-co-sebacate) resin according to the present invention is 3.0 g/10 min-20.0 g/10 min at 190° C. based on a weight of 2.16 kg. When the melt index is lower than 3.0 g/10 min, energy consumption of the processing becomes higher, and the processing is uneconomical. When the melt index is higher than 20.0 g/10 min, the film bubble is unstable in the processing, and quality of the film material becomes worse.

An intrinsic viscosity of the poly(terephthalate-co-sebacate) resin according to the present invention is 1.1 dl/g-1.5 dl/g, and a test method of the intrinsic viscosity is using a Ubbelohde viscometer at room temperature (25+0.01° C.) as a test temperature with phenol and o-dichlorobenzene as solvents in a mass ratio of 3:2, wherein an inner diameter of capillary of the viscometer is 0.84 mm, a volume of C-bulb is 4.0 mL (+5%), and an inner diameter of P-arm is 6.0 mm (+5%). When the intrinsic viscosity is higher than 1.5 dl/g, the processing becomes difficult, and when the intrinsic viscosity is lower than 1.1 dl/g, the mechanical property of the film material becomes very poor.

A weight content of the butanediol terephthalate unit in the poly(terephthalate-co-sebacate) resin is 41.3%-56.3%. When the weight content of the butanediol terephthalate unit is lower than 41.3%, the obtained product is very soft, thereby going against application. When the weight content of the butanediol terephthalate unit is higher than 56.3%, the obtained product is very hard, thereby going against application.

The poly(terephthalate-co-sebacate) resin composition according to the present invention may be obtained by directly adding at least one alkane selected from the group consisting of hexadecane, heptadecane, octadecane, nonadecane and eicosane in the process of mixing, extruding and processing the poly(terephthalate-co-sebacate) resin composition.

According to different requirements for application, the poly(terephthalate-co-sebacate) resin composition according to the present invention further comprises other adjuvant, which is one or more than one of an antioxidant, a light stabilizer, an impact modifier, a fire retardant, a fluorescent brightener, a plasticizer, an antistatic agent, a release agent and a pigment.

The antioxidant is one or more than one selected from the group consisting of a hindered amine antioxidant, a hindered phenolic antioxidant and a phosphite antioxidant, specifically listed as one of or a mixture of two or more of 1010, 168, 1076, 445 and 1098;

the light stabilizer is a hindered amine light stabilizer, specifically listed as one of or a mixture of two or more of UV-944, UV-234, 770DF, 328 and 531;

the impact modifier is one of or a mixture of two of PTW and styrene-ethylene/butene-styrene block copolymer (SEBS);

the fire retardant is one of or a mixture of two or more of red phosphorus, OP1240 and OP1230;

the fluorescent brightener is one of or a mixture of two of bis(triazinyl-amino)stilbene and titanium dioxide;

the plasticizer is one of or a mixture of two or more of glycerin, citric acid, butyl citrate, epoxidized soybean oil, and the like;

the antistatic agent is a permanent antistatic agent, specifically listed as one of or a mixture of two or more of PELESTAT-230, PELESTAT-6500 and SUNNICO ASA-2500;

the release agent is one of or a mixture of two or more of silicone oil, paraffin, white mineral oil and vaseline; and the pigment is one of or a mixture of two or more of carbon black, black masterbatch, titanium dioxide, zinc sulfide, phthalocyanine blue and fluorescent orange.

Compared with the prior art, the present invention has the following beneficial effects:

By adding at least one alkane selected from the group consisting of hexadecane, heptadecane, octadecane, nonadecane and eicosane in the poly(terephthalate-co-sebacate) resin composition, and controlling the content of alkane in the composition within a range of 5 ppm-1000 ppm, the present invention not only enables the poly(terephthalate-co-sebacate) resin to have obviously improved blow molding characteristics, a film thickness range of less than 0.3 μm and a relative deviation of film thickness of less than 2.0%, thereby guaranteeing the bubble stability and the continuity of blow molding, but also enables the film material to prevent the ink from stripping off the film material, and prevent excessive ink from adhering to the film material in the printing process, so that the film shows excellent printing performance.

DESCRIPTION OF THE PREFERRED EMBODIMENTS

The present invention is further illustrated below in conjunction with the embodiments, and the following examples are preferred embodiments of the present invention. However, the embodiments of the present invention are not limited to the following examples.

All of the raw materials used in the examples and comparative examples are available on the market.

Synthesis of a Poly(Terephthalate-Co-Sebacate) Resin (PBSeT):

Under the protection of high purity nitrogen, measured amounts of sebacic acid and 1,4-butanediol were added into a reactor and heated to 200-210° C., and a reaction was kept for 1 hour; terephthalic acid and tetra-(2-ethylhexyl)titanate were added thereto and heated to 220-230° C., and the reaction was kept for 1-2 hours; a measured amount of at least one alkane selected from the group consisting of hexadecane, heptadecane, octadecane, nonadecane and eicosane was added, the reactor was vacuumized to a pressure within the reactor below 100 Pa or less in 2 hours, and the reaction was kept at 230-260° C. for 2-4 hours. After stopping stirring, high purity nitrogen was filled in the reactor, a resulting resin was extruded from the reactor for granulation, and then the desired resin was obtained. By changing feeding amounts of sebacic acid and terephthalic acid, different structures of poly(terephthalate-co-sebacate) resin (PBSeT) can be obtained.

Examples 1-18 and Comparative Examples 1-4

According to formulas shown in Table 1, poly(terephthalate-co-sebacate) resin, at least one alkane selected from the group consisting of hexadecane, heptadecane, octadecane, nonadecane and eicosane, and other adjuvant such as antioxidant 1010 were mixed uniformly, added into a single-screw extruder, extruded at 140° C.-240° C., and granulated to obtain a poly(terephthalate-co-sebacate) resin composition. Performance test data are shown in Table 1.

Performance Evaluation Method:

(1) Evaluation Method of Printing Performance of a Film of the Poly(Terephthalate-Co-Sebacate) Resin Composition:

Films of the poly(terephthalate-co-sebacate) resin compositions with different printing effects were graded according to the clarity of a printed label and the adhesion of ink to film surface, as follows:

grade 1: the label is clear without excess ink adhering to the film;

grade 2: the label is clear with a little ink adhering to the film;

grade 3: the label is basically clear with much ink adhering to the film;

grade 4: the label is obscure with very much ink adhering to the film; and grade 5: the label cannot be seen, and no ink adheres to the film.

(2) Evaluation Method of Bubble Stability of a Film of the Poly(Terephthalate-Co-Sebacate) Resin Composition:

The bubble stability of the film of the poly(terephthalate-co-sebacate) resin composition was evaluated based on a thickness range of the film material and a relative deviation of the film material thickness:

The film thickness was tested with a screw thread micrometer: 10 measurement points were taken evenly on a film of 1 m*1 m for measuring.

The film thickness range was a difference value between the maximum thickness and the minimum thickness of the 10 measurement points.

The relative deviation of the film thickness was calculated as per the following formula:

relative deviation of film thickness %=film thickness range/average film thickness×100% wherein the average film thickness was calculated as an arithmetic average of the thicknesses measured respectively at the 10 measurement points which were taken evenly on the film of 1 m*1 m.

(3) Determination Method of Alkane:

1.2000 g of precisely weighed poly(terephthalate-co-sebacate) resin composition was added in a 25 mL volumetric flask and dissolved with chloroform. After the poly(terephthalate-co-sebacate) resin composition was fully dissolved, it was diluted to the mark. A peak area of the alkane in the resulting solution was tested by GC-MS, and a content of alkane in the poly(terephthalate-co-sebacate) resin composition was obtained through calculation based on the peak area of the alkane in the resulting solution and a standard curve of the alkane; and the standard curve was calibrated by the alkane/chloroform solution.

GC-MS model and parameters are as follows:

Agilent Technologies 7693 AutoSampler;

Agilent Technologies 5975C inert MSD with Triple-Axis Detector;

chromatographic column: J&W 122-5532 UI: 350° C.: 30 m×250 μm×0.25 μm;

sample injection: front SS injection port He; and sample production: vacuum.

TABLE 1

Test Data in Comparative Examples 1-4 and Examples 1-18 (parts by weight)

| | | Comparative Example 1 | Comparative Example 2 | Comparative Example 3 | Comparative Example 4 | Example 1 | Example 2 | Example 3 | Example 4 | Example 5 | Example 6 | Example 7 |
|---|---|---|---|---|---|---|---|---|---|---|---|---|
| PBSeT | Additive amount | 100 | 100 | 100 | 100 | 100 | 100 | 100 | 100 | 100 | 100 | 100 |
| | Melt index (g/10 min) | 4.0 | 4.0 | 4.0 | 6.0 | 4.0 | 4.0 | 4.0 | 4.0 | 4.0 | 4.0 | 9.0 |
| | Intrinsic viscosity | 1.41 | 1.41 | 1.41 | 1.37 | 1.41 | 1.41 | 1.41 | 1.41 | 1.41 | 1.41 | 1.27 |
| | Weight content of butanediol phthalate unit, % | 50.2 | 50.2 | 50.2 | 50.2 | 50.2 | 50.2 | 50.2 | 50.2 | 50.2 | 50.2 | 55.3 |
| Hexadecane content (based on the whole composition)/ppm | | 0 | 2 | 1100 | | 15 | 100 | 10 | 500 | 5 | 1000 | |
| Heptadecane content (based on the whole composition)/ppm | | | | | | | | | | | | 20 |
| Octadecane content (based on the whole composition)/ppm | | | | | | | | | | | | |
| Nonadecane content (based on the whole composition)/ppm | | | | | | | | | | | | |
| Eicosane content (based on the whole composition)/ppm | | | | | 1150 | | | | | | | |
| Antioxidant 1010 | | 1.5 | 1.5 | 1.5 | 1.5 | 1.5 | 1.5 | 1.5 | 1.5 | 1.5 | 1.5 | 1.5 |
| Printing performance grade | | 4 | 4 | 4 | 5 | 1 | 1 | 2 | 2 | 2 | 3 | 1 |
| Blow molding and extruding velocity/kg/h | | 180 | 180 | 180 | 180 | 180 | 180 | 180 | 180 | 180 | 180 | 180 |
| Film thickness range/μm | | 0.6 | 0.4 | 0.3 | 0.31 | 0.18 | 0.12 | 0.23 | 0.21 | 0.29 | 0.26 | 0.19 |
| Relative deviation of film thickness/% | | 4.0 | 2.7 | 2.0 | 2.1 | 1.2 | 0.8 | 1.5 | 1.3 | 1.9 | 1.7 | 1.2 |

| | | Example 8 | Example 9 | Example 10 | Example 11 | Example 12 | Example 13 | Example 14 | Example 15 | Example 16 | Example 17 | Example 18 |
|---|---|---|---|---|---|---|---|---|---|---|---|---|
| PBSeT | Additive amount | 100 | 100 | 100 | 100 | 100 | 100 | 100 | 100 | 100 | 100 | 100 |
| | Melt index (g/10 min) | 9.0 | 9.0 | 17 | 17 | 17 | 3.4 | 3.4 | 6.0 | 6.0 | 4.0 | 4.0 |
| | Intrinsic viscosity | 1.27 | 1.27 | 1.14 | 1.14 | 1.14 | 1.44 | 1.44 | 1.37 | 1.37 | 1.41 | 1.41 |
| | Weight content of butanediol phthalate unit, % | 55.3 | 55.3 | 46.2 | 46.2 | 46.2 | 43.2 | 43.2 | 50.2 | 50.2 | 50.2 | 50.2 |
| Hexadecane content (based on the whole composition)/ppm | | | | | | | | | | | 100 | 100 |
| Heptadecane content (based on the whole composition)/ppm | | 400 | 168 | | | | | | | | | |
| Octadecane content (based on the whole composition)/ppm | | | | 86 | 238 | 589 | | | | | | |
| Nonadecane content (based on the whole composition)/ppm | | | | | | | 73 | 325 | | | | |
| Eicosane content (based on the whole composition)/ppm | | | | | | | | | 69 | 800 | | |
| Antioxidant 1010 | | 1.5 | 1.5 | 1.5 | 1.5 | 1.5 | 1.5 | 1.5 | 1.5 | 1.5 | 1.5 | 1.5 |
| Printing performance grade | | 2 | 2 | 1 | 2 | 3 | 1 | 2 | 1 | 3 | 2 | 2 |

TABLE 1-continued

Test Data in Comparative Examples 1-4 and Examples 1-18 (parts by weight)

| | | | | | | | | | | | |
|---|---|---|---|---|---|---|---|---|---|---|---|
| Blow molding and extruding velocity/kg/h | 180 | 180 | 180 | 180 | 180 | 180 | 180 | 180 | 180 | 120 | 210 |
| Film thickness range/μm | 0.24 | 0.22 | 0.18 | 0.21 | 0.25 | 0.19 | 0.23 | 0.18 | 0.25 | 0.29 | 0.28 |
| Relative deviation of film thickness/% | 1.6 | 1.5 | 1.1 | 1.4 | 1.7 | 1.3 | 1.5 | 1.2 | 1.7 | 1.9 | 1.8 |

As can be seen from Table 1, the poly(terephthalate-co-sebacate) resin composition having alkane in a weight content of 5-1000 ppm can reach printing performance grade 3 or higher, has excellent printing performance, and has a film thickness range of less than 0.3 μm and a relative deviation of film thickness of less than 2.0% at a blow molding velocity of 180 kg/h, indicating that the composition has better bubble stability. At a blow molding velocity of lower than 180 kg/h in Example 17 or higher than 180 kg/h in Example 18, the film bubbles of the composition are less stable, compared with that in Example 1. At a content of alkane of lower than 5 ppm or 0 in Comparative Examples 1-2, the printing performance grade of the composition is 4, the film thickness range is more than 0.3 μm, and the relative deviation of the film thickness is more than 2.0%. At a content of alkane of higher than 1000 ppm in Comparative Examples 3-4, the printing performance grade of the composition is 5, the film thickness range is more than 0.3 μm, and the relative deviation of the film thickness is more than 2.0%, indicating that the printing performance and the bubble stability of the composition are poor.

What is claimed is:

1. A biodegradable poly(terephthalate-co-sebacate) resin composition, comprising the following components:
   a poly(terephthalate-co-sebacate) resin composition; and
   an alkane selected from a group consisting of hexadecane, heptadecane, octadecane, nonadecane and eicosane, and any combination thereof; and
   wherein a weight content of the alkane is 15 ppm to 100 ppm based on a total weight of the poly(terephthalate-co-sebacate) resin composition.

2. The biodegradable poly(terephthalate-co-sebacate) resin composition according to claim 1, wherein a melt index of the poly(terephthalate-co-sebacate) resin is 3.0 g/10 min-20.0 g/10 min at 190° C. based on a weight of 2.16 kg; and an intrinsic viscosity thereof is 1.1 dl/g-1.5 dl/g.

3. The biodegradable poly(terephthalate-co-sebacate) resin composition according to claim 1, wherein a weight content of butanediol terephthalate in the poly(terephthalate-co-sebacate) resin is 41.3%-56.3%.

4. The biodegradable poly(terephthalate-co-sebacate) resin composition according to claim 1, wherein the poly(terephthalate-co-sebacate) resin composition further comprises other adjuvant, and the adjuvants is one or more than one of an antioxidant, a light stabilizer, an impact modifier, a fire retardant, a fluorescent brightener, a plasticizer, an antistatic agent, a release agent and a pigment.

5. The biodegradable poly(terephthalate-co-sebacate) resin composition according to claim 1, wherein the poly(terephthalate-co-sebacate) resin composition has an average film thickness of less than 0.3 μm and a relative deviation of film thickness of less than 2.0% at a blow molding and extruding velocity of 180 kg/h.

6. The biodegradable poly(terephthalate-co-sebacate) resin composition according to claim 2, wherein the poly(terephthalate-co-sebacate) resin composition has an average film thickness of less than 0.3 μm and a relative deviation of film thickness of less than 2.0% at a blow molding and extruding velocity of 180 kg/h.

7. The biodegradable poly(terephthalate-co-sebacate) resin composition according to claim 3, wherein the poly(terephthalate-co-sebacate) resin composition has an average film thickness of less than 0.3 μm and a relative deviation of film thickness of less than 2.0% at a blow molding and extruding velocity of 180 kg/h.

8. The biodegradable poly(terephthalate-co-sebacate) resin composition according to claim 4, wherein the poly(terephthalate-co-sebacate) resin composition has an average film thickness of less than 0.3 μm and a relative deviation of film thickness of less than 2.0% at a blow molding and extruding velocity of 180 kg/h.

* * * * *